United States Patent [19]

Rhee et al.

[11] Patent Number: 5,194,755
[45] Date of Patent: Mar. 16, 1993

[54] AIRBAG TRIGGERING SYSTEM

[75] Inventors: Dennis W. Rhee, Bloomfield Hills; Colm P. Boran, Northville; David J. Bauch, Dearborn; Michael J. Lynch, Livonia, all of Mich.

[73] Assignee: Ford Motor Company, Dearborn, Mich.

[21] Appl. No.: 665,199

[22] Filed: Mar. 4, 1991

[51] Int. Cl.⁵ ............................................. B60R 21/32
[52] U.S. Cl. ................................. 307/10.1; 280/735
[58] Field of Search ............... 307/10.1, 121; 340/436, 340/438; 280/734, 735; 180/282, 274; 364/424.01, 424.05

[56] References Cited

U.S. PATENT DOCUMENTS

| | | | |
|---|---|---|---|
| 3,633,159 | 1/1972 | Dillm et al. | 340/436 |
| 3,863,208 | 1/1975 | Balban | 340/436 |
| 3,870,894 | 3/1975 | Brede et al. | 307/9.1 |
| 3,889,232 | 6/1975 | Bell | 340/436 |
| 4,117,730 | 10/1978 | Spies et al. | 73/517 R |
| 4,243,971 | 1/1981 | Suchowerskyj et al. | 340/436 |
| 4,359,715 | 11/1982 | Langer et al. | 340/436 |
| 4,366,465 | 12/1982 | Veneziano | 340/436 |
| 4,410,875 | 10/1983 | Spies et al. | 340/436 |
| 4,638,179 | 1/1987 | Mattes et al. | 307/10.1 |
| 4,641,041 | 2/1987 | Mattes et al. | 307/10.1 |
| 4,873,452 | 10/1989 | Morota et al. | 307/10.1 |
| 4,958,851 | 9/1990 | Behr et al. | 280/735 |
| 4,987,316 | 1/1991 | White et al. | 307/10.1 |

Primary Examiner—A. D. Pellinen
Assistant Examiner—David Osborn
Attorney, Agent, or Firm—Allan J. Lippa; Peter Abolins

[57] ABSTRACT

A plurality of first accelerometers are positioned forward of the passenger compartment and interconnected between vehicular ground and an airbag ignitor. At least one second accelerometer is positioned with the passenger compartment and electrically connected in series between the airbag ignitor and a reserve source of electrical power thereby providing a first firing path. Electronic circuitry positioned within the passenger compartment and connected to the airbag ignitor provides a second firing path through the ignitor to a passenger compartment ground independent of the vehicular ground which the first accelerometers are connected. This second conductive path is provided for a predetermined or dwell time in response to actuation by any of the first accelerometers. The electrical circuitry also includes prefiltering circuitry.

12 Claims, 5 Drawing Sheets

AIRBAG TRIGGERING SYSTEM

BACKGROUND OF THE INVENTION

The field of the invention relates to triggering systems which activate safety devices, such as airbags, during a vehicular crash.

It has been proposed to deploy crash sensors, commonly referred to as accelerometers, in the forward area of a vehicle and connect these sensors in series between a vehicular ground, located in proximity to the sensors, and an airbag ignitor which in turn is connected to the vehicle's battery. Several sensors may be connected in parallel and the parallel combination connected in series with the ignitor.

It has also been proposed to connect a Schmidt trigger in series with a sensor to prolong activation of the ignitor. Connecting an integrator between the sensor and ignitor for allegedly extending ignition time has also been proposed as disclosed in U.S. Pat. No. 4,638179 issued to Mattes.

SUMMARY OF THE INVENTION

An object of the invention herein is to couple electronic dwell circuitry to an accelerometer and provide two redundant firing paths for a safety device ignitor, one path through the dwell circuitry and the other path through the accelerometer wherein one path is connected to a passenger compartment ground independent of the vehicular ground to which the accelerometer is connected.

The above object is achieved, and disadvantages of proposed approaches are overcome, by providing a triggering system which applies electrical power to an electrical ignitor of an airbag positioned in the passenger compartment of a motor vehicle. In one particular aspect of the invention, the triggering systems comprises: a plurality of first accelerometers positioned forward of the passenger compartment, each being electrically connected between the electrical ignitor positioned within the passenger compartment and a vehicular ground located forward of the passenger compartment; circuitry means positioned in the passenger compartment and electrically connected between the electrical ignitor and an electrical ground independent of the vehicular ground for providing a conductive state during a predetermined time after actuation of any of the first accelerometers; and a second accelerometer electrically connected in series between the electrical ignitor and a source of electrical power for coupling electrical power through the electrical ignitor to the vehicular ground upon simultaneous actuation of the second accelerometer and any of the first accelerometers, the electrical power also being coupled through the electrical ignitor to the independent ground upon actuation of the second accelerometer concurrently with the conductive state of the circuitry means.

An advantage of the above aspect of the invention is that two redundant firing paths are provided for the ignitor. One path couples electrical power through the second accelerometer, ignitor, and circuitry means to an electrical ground located within the passenger compartment which is independent of the vehicular ground located forward of the passenger compartment. Another path couples its electrical power through the second accelerometer and, ignitor, and a first accelerometer to the vehicular ground.

BRIEF DESCRIPTION OF THE DRAWINGS

The objects and advantages described herein will be more fully understood by reading an example of an embodiment in which the invention is used to advantage, referred to as the preferred embodiment, with reference to the drawings wherein.

DESCRIPTION OF THE PREFERRED EMBODIMENT

Figure 1:
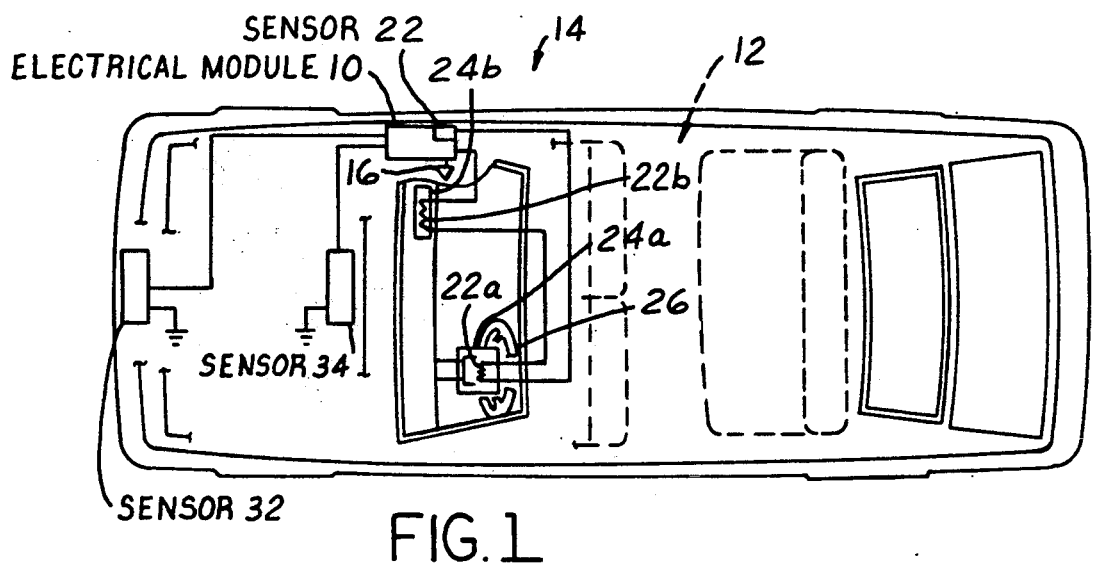
FIG. 1 is a schematic representation of a motor vehicle showing general placement of the airbags, sensors, and electrical module 10.

Referring first to the example presented in FIG. 1, electrical module 10 is shown positioned within passenger compartment 12 of motor vehicle 14. As described in greater detail later herein with particular reference to FIGS. 2A-2D, module 10 is coupled to battery power $V_B$, ignition power $V_I$ and instrument panel electrical ground 16 located within passenger compartment 12. Sensor 22, an accelerometer responsive to vehicular forces of acceleration and deceleration, is shown positioned within passenger compartment 12 and coupled to instrument panel ground 16. In this particular example, sensor 22 is shown positioned within electrical module 10 although other locations in proximity to passenger compartment 12 may be used to advantage.

Electrical module 10 is coupled to electrical ignitor 22a of airbag module 24a, a conventional chemically actuated airbag with electrical ignitor in this particular example, which is positioned within steering wheel assembly 26. Module 10 is also shown connected to electrical ignitor 22b of airbag module 24b shown positioned on the passenger side of passenger compartment 12. Although a protection system is shown having two airbags in particular locations, it is recognized that the invention may be used to advantage with any number of airbags and the invention is not limited to any particular airbag locations. Further, the invention may be used to advantage with protection devices other than airbags such as seat belt restraint systems.

Sensor 32 and sensor 34, both accelerometers sold by Breed Company as part nos. F2DB-14B006 and F2DB-14B004 in this particular example, are shown positioned forward of passenger compartment 12 in what is referred to as the crush zone of vehicle 14. Sensor 32 is shown connected in series between module 10 and a vehicular electrical ground located in physical proximity to sensor 32 within the crush zone of vehicle 14. Similarly, sensor 34 is shown electrically connected in series between module 10 and a vehicular ground located in physical proximity to sensor 34. In this particular example, sensors 32 and 34 are adjusted to have a lower sensitivity to vehicular deceleration than the sensitivity of sensor 22.

Figure 2D:
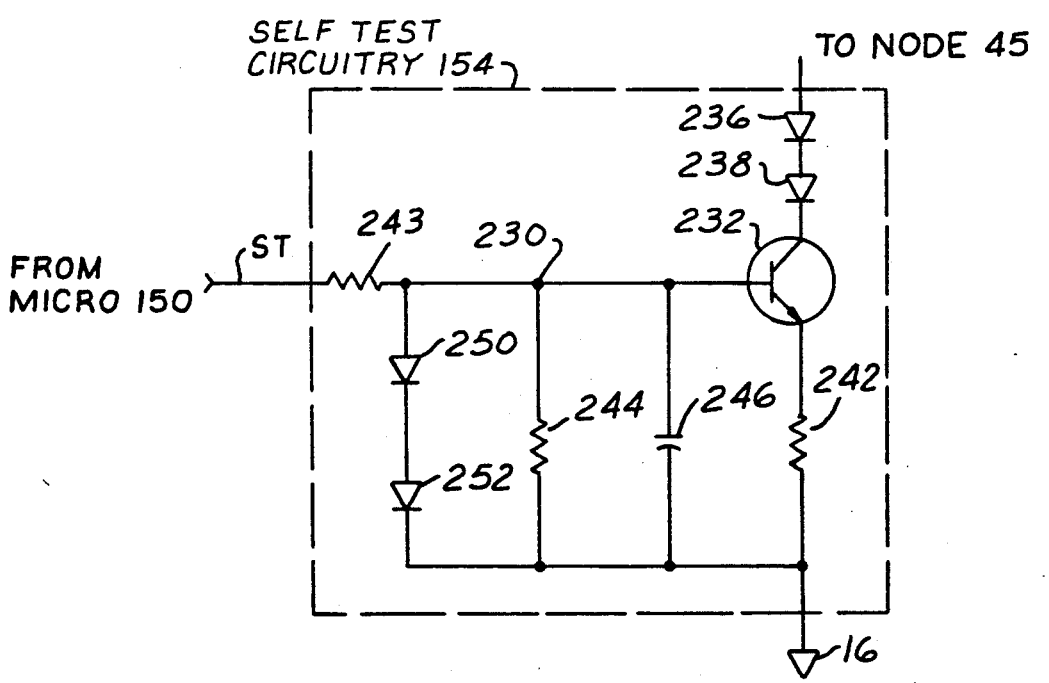
FIG. 2D is an electrical schematic of the self-test circuitry shown in FIG. 1.
Figure 2A:
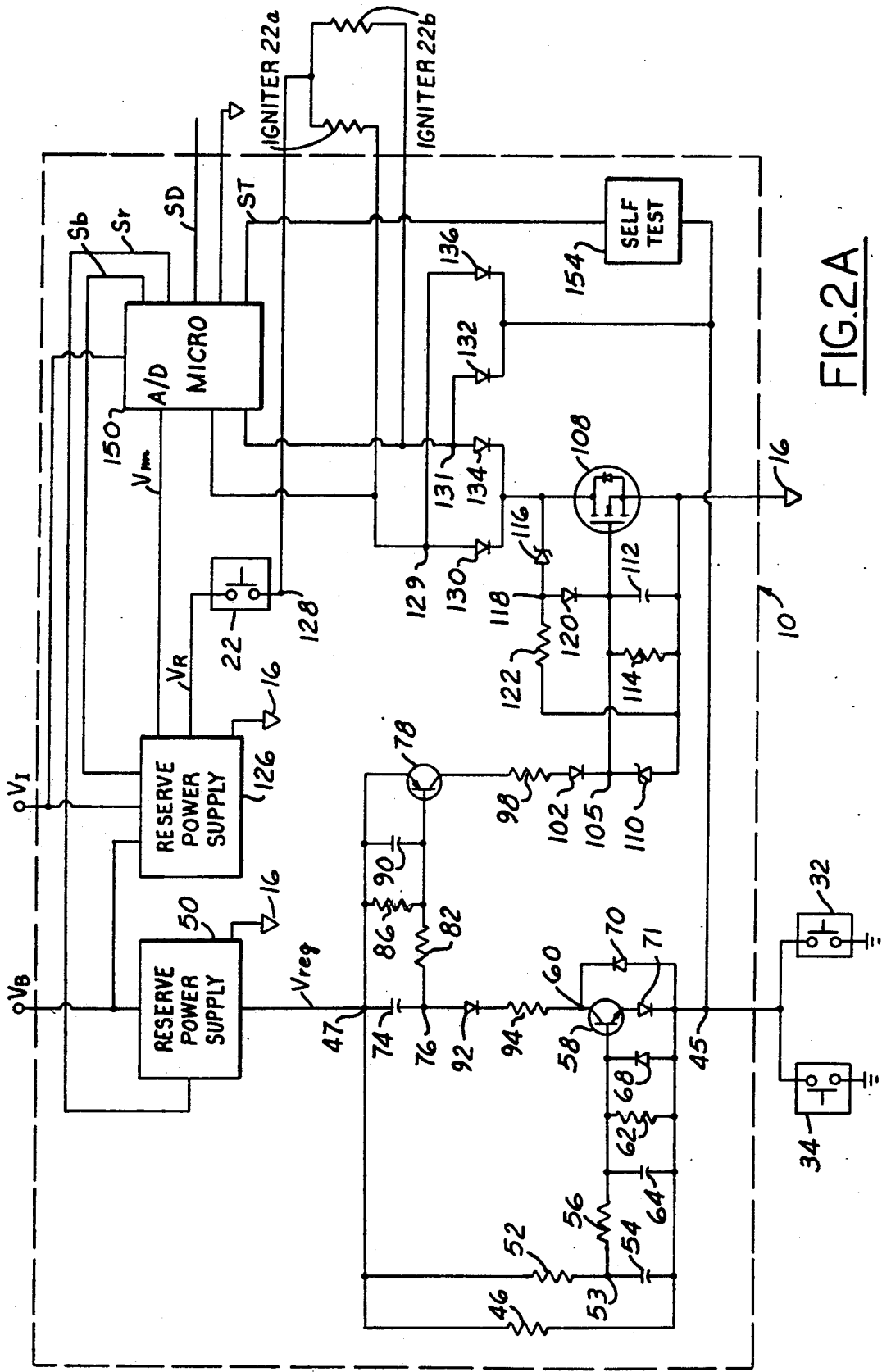
FIG. 2A is an electrical schematic of electrical module 10 and its interconnection with the sensors shown in FIG. 1.

An electrical schematic of module 10, ignitors 22a-b, on sensors 22, 32, and 34 is shown in FIG. 2A. Sensors 32 and 34 are shown connected between the vehicular ground, located within the vehicle crush zone, and node 45. Resistor 46 is shown connected between node 45 and node 47. Reserve power supply 50, which is described in greater detail later herein with particular reference to FIG. 2C, is shown providing voltage Vreg to node 47. Resistor 52 is connected in series between node 47 and node 53. Capacitor 54 is shown having its positive plate connected to node 53 and its negative plate connected to node 45. Resistor 56 is connected in series between node 53 and the base terminal of transistor 58, on NPN transistor in this example having its emitter electrode coupled to node 45 and its collector electrode coupled to node 60. Resistor 62 is shown coupled in series between the gate electrode of transistor 58 and node 45.

Resistor 52 and capacitor 54 form an RC circuit for charging capacitor 54 at time constant TC1 when either sensor 32 or sensor 34 are actuated. Resistors 56 and 62 form a divider network for applying a portion of electrical power at node 53 to the gate electrode of transistor 58 as capacitor 54 is being charged. Capacitor 64, which is shown coupled in series between the base of transistor 58 and node 45, Provides transient filtering. Diode 68, connected between the base and emitter electrodes of transistor 58, and diode 70, connected between the emitter and collector of transistor 58, prevent false triggering by voltage transients at node 45.

As described in greater detail later herein with particular reference to FIGS. 3A-3F, the above described circuitry provides prefiltering to the turn on of transistor 58. That is, before transistor 58 is turned on, node 45 must be at ground potential for a preselected time which is determined by the charging of capacitor 54. This prefiltering may be used to advantage for filtering electromagnetic noise at node 45. It may also be used to filter sensors 32 and 34 in applications where these sensors have very high response sensitivity.

Continuing with FIG. 2A, circuitry within module 10 for electronically adding a dwell period for prolonging the on-state of transistor 78 is now described. Capacitor 74 is shown having its positive electrode connected to node 47 and its negative electrode connected to node 76. Transistor 78, a PNP transistor in this example, is shown having its emitter electrode connected to node 47. Resistor 82 is shown connected in series between node 76 and the base electrode of transistor 78. As described in greater detail later herein with particular reference to FIGS. 3A-3F, capacitor 74 is discharged through resistors 82 and 86 at time constant TC2 after transistor 58 is turned on. This discharge provides a minimum on time for transistor 78 (i.e., dwell) after transistor 58 is turned on.

Capacitor 90 is shown coupled between the emitter and base electrodes of transistor 78 providing transient filtering in a conventional manner. Diode 92 is shown having its anode connected to node 76 and its cathode connected to resistor 94 which in turn is connected in series to the collector electrode of transistor 58. Resistor 94, having a relatively low resistance value such as 10 ohms, provides a relatively fast charging of capacitor 74 upon turn on of transistor 58. Diode 92 is utilized as a blocking diode for preventing resistor 46 from recharging capacitor 74 upon opening of either sensors 32 or 34.

A description of the transistor output stage of module 10 is now described with continuing reference to FIG. 2A. Resistor 98 and diode 102 are shown connected in series between the collector electrode of transistor 78 and node 105. Transistor 108, an n-channel enhancement mode MOSFET in this example, is shown having its gate electrode connected to node 105 and its source electrode connected to electrical ground 16 of the instrument panel. Zener diode 110 is shown coupled between the source and gate electrodes of transistor 108 for providing overload Protection thereto in a conventional manner. Capacitor 112 and resistor 114 are shown coupled between the gate and source electrodes of transistor 108 for providing conventional transient filtering. Additional protection for transistor 108 is provided by Zener diode 116 shown having its cathode connected to the drain of transistor 108 and its anode connected to node 118. Diode 120 is shown coupled between node 118 and the gate of transistor 108. Resistor 122 is shown coupled in series between node 118 and electrical ground 16. Transistor 108 acts as a power driver which is actuated during the on-time of transistor 78 as described further hereinbelow.

Continuing with FIG. 2A, the interconnection of sensor 22 within module 10 is now described. Sensor 22 is shown coupled between node 128 and the voltage output ($V_R$) of reserve power supply 126 which is described in detail later herein with particular reference to FIG. 2B. Ignitor 22a (external to module 10) is shown connected between node 128 and the anodes of both diodes 130 and 136 via node 129. Similarly, ignitor 22b (external to module 10) is shown connected between node 128 and node 131 which in turn is connected to the anodes of both diodes 132 and 134. The cathodes of diodes 130 and 134 are connected to the drain electrode of transistor 108, and the cathodes of diodes 132 and 136 are connected to node 45. Diodes 130, 132, 134, and 136 provide electrical isolation of ignitors 22a-b during diagnostic procedures and any shorting of sensors 32 or 34. They also prevent latching of transistor 108 after crash sensing.

In accordance with the above description, ignitors 22a-b are electrically actuable through either of two parallel firing paths. The first firing path includes the interconnection of reserve power supply 126, sensor 22, diodes 130 and 134, transistor 108, and passenger compartment ground 16. The second firing path includes the electrical interconnection of reserve power supply 126, sensor 22, diodes 132 and 136, either sensor 32 or 34, and vehicular ground. Thus, when sensor 22 is actuated concurrently with either sensor 32 or 34, ignitors 22a-b are electrically actuated. In addition, ignitors 22a-b are electrically actuated during the dwell or on-time of transistor 108, as provided by transistor 78, and concurrent closure of sensor 22. Two redundant firing paths for ignitors 22a-b are thereby provided.

In the event of electrical failure in the circuitry of module 10, a firing path is still provided through the interconnection of sensor 22 and either sensors 32 or 34. Further, if sensors 32 and 34 become disabled during the crash, such as by destruction of their vehicular ground interconnection, a firing path is still provided through module 10 (during its dwell time) and sensor 22.

Continuing with FIG. 2A, conventional microprocessor 150 is shown providing self test signal ST to self test circuitry 154. As described in greater detail later herein with particular reference to FIG. 2D, self test circuitry couples a negative going pulse to node 45 to simulate closure of sensors 32 and 34. Microprocessor 150 monitors various points on module 10 such as nodes 129 and 131 for providing diagnostic signal SD to locations external from module 10 such as the electronic engine controller, dashboard volt indicator lights, or external testing stations.

Figure 2B:
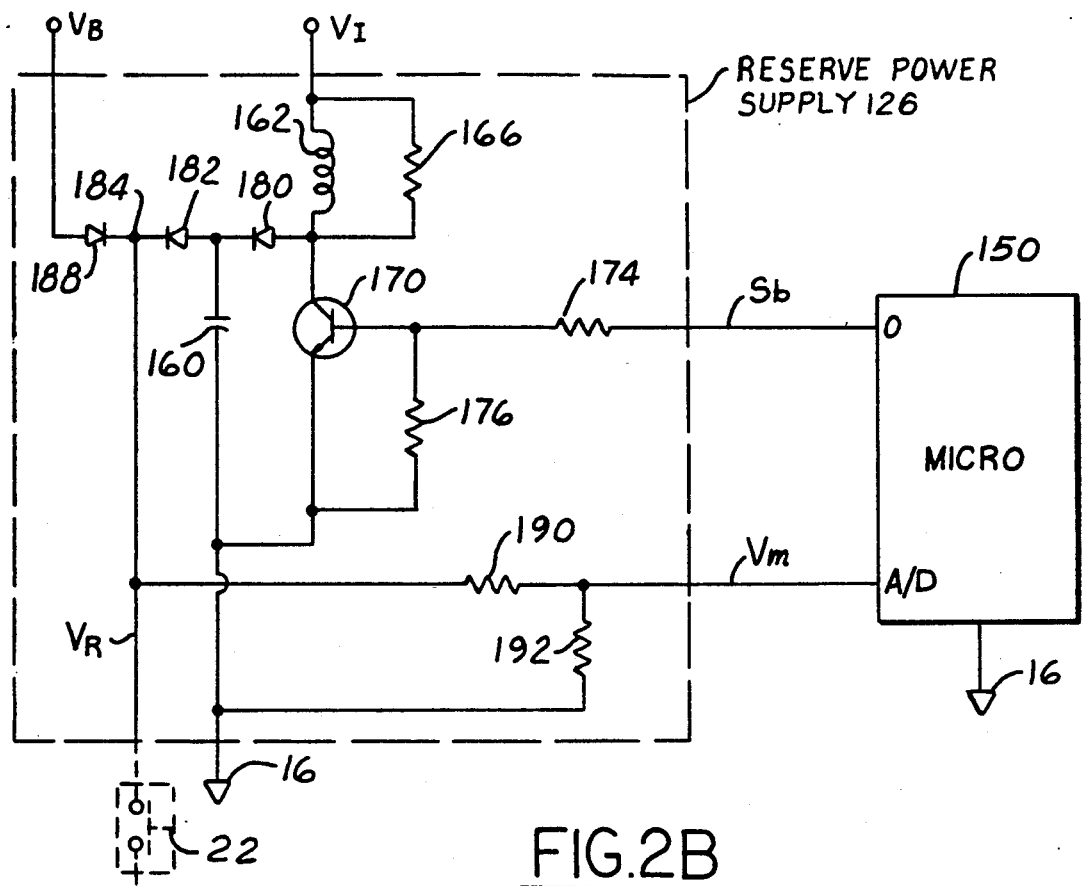
FIG. 2B is an electrical schematic of the reserve power supply 126 shown in FIG. 1 which is coupled to the electrical ignitors of the airbag system.
Figure 2C:
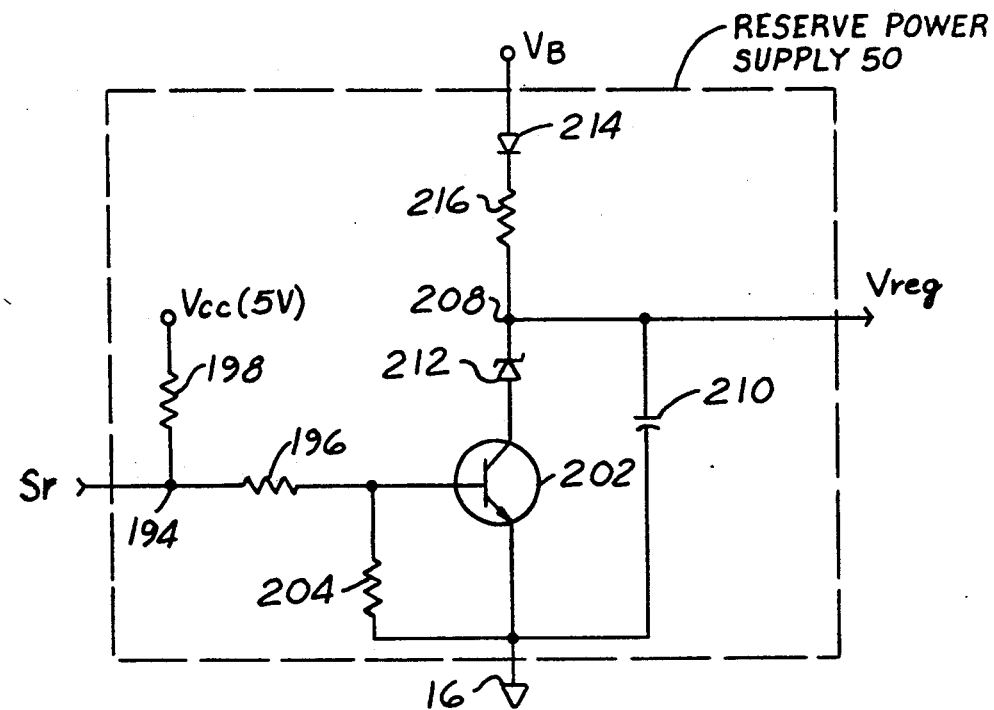
FIG. 2C is an electrical schematic of the reserve power supply 50 shown in FIG. 1 which powers the electrical circuitry of electrical module 10.

Referring now to FIG. 2B, and also continuing with FIG. 2A, reserve power supply 126 is now described. In general terms, reserve power supply 126 is a flyback type boost circuit which raises battery voltage $V_B$ to a higher value (25 volts in this particular example) than $V_B$ by charging capacitor 160 through the resistance of inductor 162 and resistor 166. Reserve power supply 126 provides the A/D input of microprocessor 150 with voltage signal $V_m$ which is proportional to its output voltage $V_R$. In response, microprocessor 120 provides output signal Sb to voltage supply 126 for charging capacitor 160 as explained in greater detail herein.

Inductor 162 and resistor 166 are shown coupled in parallel between ignition voltage $V_I$ and the collector of transistor 170 which is a NPN transistor in this particular example. The emitter of transistor 170 is shown coupled to passenger compartment ground 16 as is the negative plate of capacitor 160. A resistive voltage divider including resistors 174 and 176 is shown coupled to the base electrode of transistor 170 and passenger compartment ground 16. This resistive voltage divider is connected to signal Sb from microprocessor 150 for providing a proportional signal to the base electrode of transistor 170.

Blocking diode 180 is shown having its anode connected to the collector terminal of transistor 170 and its cathode connected to the positive plate of capacitor 160. Diode 182 is shown having its anode connected to the positive plate of capacitor 160 and its cathode connected to node 184 which provides reference output voltage $V_R$ to sensor 22. Diode 182 prevents battery current from charging capacitor 160 when the vehicular ignition is off. Isolation diode 188 is shown having its cathode connected to node 184 and its anode connected to battery voltage $V_B$ for isolating capacitor 160 from the battery. A resistive divider network including resistors 190 and 192 is shown coupled between node 184 and passenger compartment electrical ground 16 for providing signal $V_m$ to the A/D input of microprocessor 150. Accordingly, signal $V_m$ provides microprocessor 150 with an input proportional to reference signal $V_R$ from reserve voltage supply 126.

During operation, when the vehicular ignition is first turned on, signal Sb from microprocessor 150 is at a zero level. The parallel resistive combination of resistor 166 and inductor 162 provides current to capacitor 160 via diode 180 thereby charging capacitor 160 to ignition voltage $V_I$ (12 volts in this particular example). Since signal $V_m$ provided by reserve voltage supply 126 will then indicate that reference voltage $V_R$ is less than its desired value (12 volts rather than the desired 25 volts in this particular example), microprocessor 150 will toggle boost signal Sb between zero and five volts at a frequency of 760 Hz in this particular example. During each Positive transition of boost signal Sb, transistor 170 will turn on providing current flow through inductor 162, and transistor 170 to passenger compartment electrical ground 16.

When boost signal Sb switches to a low voltage (such as 0 volts), transistor 170 turns off interrupting the current flow through inductor 162 and resistor 166. However, inductor 162 develops inductive "kick" by developing a large voltage across its terminals. As the corresponding voltage at the collector terminal of transistor 170 becomes greater than the voltage on the positive plate of capacitor 160, diode 180 becomes forward biased thereby further charging capacitor 160.

As boost signal Sb is recycled, the charge on capacitor 160 continues to increase as previously described herein. This process continues until signal $V_m$ indicates that desired reference voltage $V_R$ has reached its desired value. At this time, microcomputer 150 holds boost signal Sb at zero voltage. When reference signal $V_R$ decays a predetermined amount, as indicated by signal $V_m$, microprocessor 150 reinitiates boost signal Sb as described hereinabove. Accordingly, reference voltage $V_R$ is maintained at a desired high voltage. In addition, reference voltage $V_R$ is assured despite any damage which may occur to the vehicular battery or the vehicular ground located in the vehicle's crush zone.

Referring now to FIG. 2C, an electrical schematic for reserve power supply 50 is shown. Signal Sr, which is provided by microprocessor 150 in a high voltage state during ignition key on, is shown coupled to node 194. Pull up resistor 198 is connected between a module voltage source (5 volts in this particular example) and node 194 for providing an additional current source to signal Sr. Resistor 198 is shown connected between node 194 and the base electrode of transistor 202 which is a NPN transistor in this example. Resistor 204 is shown connected between the base and emitter electrodes of transistor 202. The combination of resistors 198 and 204 form a voltage divider for presenting a portion of signal Sr to the base electrode of transistor 202.

Capacitor 210 is shown having its negative electrode connected to the emitter of transistor 202 which in turn is connected to passenger compartment ground 16. The positive plate of capacitor 210 is shown connected to node 208. Zener diode 212 has its anode connected to the collector terminal of transistor 202 and its cathode connected to node 208 for regulating the voltage across capacitor 210 during the on state of transistor 202 thereby providing a regulated output voltage (Vreg) from reserve power supply 50 Diode 214 and resistor 216 are shown connected in series between battery voltage $V_B$ and terminal 208. Diode 214 provides protection against a grounded battery terminal and resistor 216 provides bias current to Zener diode 212.

In operation, during the ignition key off state, capacitor 210 is charged to battery voltage $V_B$ through the series interconnection of diode 214 and resistor 216. During the ignition on state, microprocessor 150 provides signal Sr to node 194 for turning on transistor 202. The anode of Zener diode 212 is thereby pulled to ground, providing a voltage reference at the breakdown voltage of Zener diode 212 (-10 volts in this particular example) for capacitor 210. Accordingly, output voltage Vreg is regulated to a substantially constant value by Zener diode 212 regardless of variations in battery voltage $V_B$. Previously described timing values provided by module 10, such as prefiltering and dwell time, are therefore not affected by battery voltage $V_B$ and remain substantially constant during all vehicle operating conditions.

Operation of the self test mode is now described with reference to FIG. 2D and continuing reference to FIG. 2A. Self test module 154 is shown having node 230 coupled to self test output ST of microprocessor 150 and the base electrode of transistor 232 which is a NPN transistor in this particular example. Transistor 232 is shown having its collector electrode coupled to node 45 through the series connection of isolation diodes 236, and 238 and also having an emitter electrode coupled to passenger compartment electrical ground 16 via resistor 242. The parallel combination of resistor 244 and capacitor 246 is shown coupled between the base electrode of transistor 232 and passenger compartment electrical ground 16 which, with series resistor 243 coupled to the base electrode, provides conventional filtering of voltage transients. The series interconnection of reference voltage diodes 250 and 252 is also shown coupled between the base electrode of transistor 232 and passenger compartment electrical ground 16. When transistor 232 is turned on, series resistor 242 provides current limiting and, accordingly, additional protection against activating ignitors 22a-b in the event of a failure in self test circuitry 154.

During self test operation, such as after activating the vehicular ignition, microprocessor 150 provides self test signal ST having a high voltage state (such as 5 volts) to the base of transistor 232 via series resistor 243. In response, transistor 232 turns "on" thereby coupling node 45 to passenger compartment electrical ground 16 during the high voltage state of signal ST. If the circuitry of module 10 is operating properly, transistor 108 will turn "on" at the beginning of self test signal ST and remain "on" for dwell time td thereafter. Nodes 129 and 131 (coupled to pull up resistors which are not shown) will be in a low voltage state during the "on" time of transistor 108. Microprocessor 150 monitors nodes 129 and 131 to verify that module 10 is properly responding to self test signal ST. In the event nodes 129 and 131 do not transition to low voltage state in response to self test signal ST, microprocessor 150 provides an indication of faulty operation via signal SD.

Figure 3A:
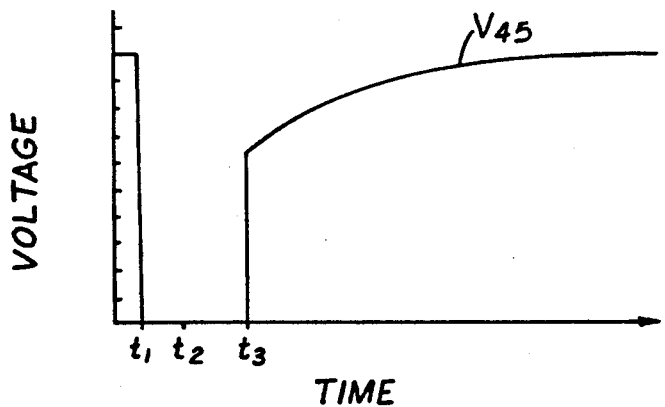
FIGS. 3A-3F show various electrical waveforms associated with the circuitry shown in FIG. 2A.
Figure 3B:
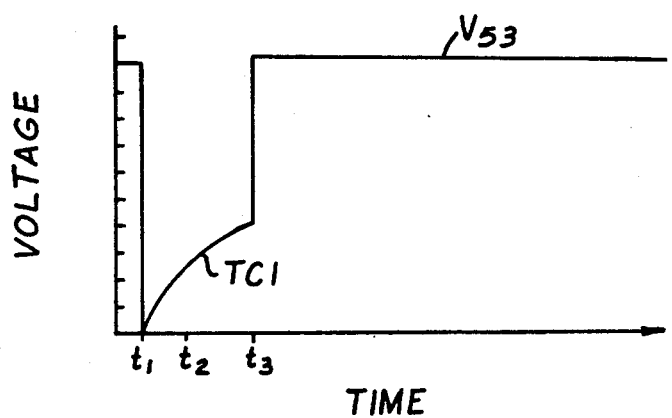
Figure 3C:
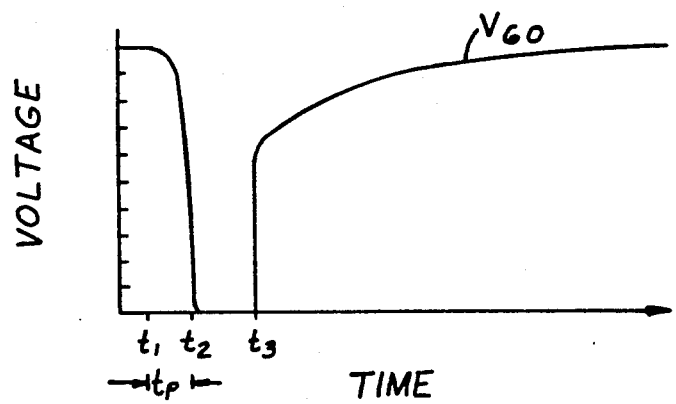

Operation of module 10, responsive to sensors 22, 32, and 34, is now described with particular reference to the electrical waveforms shown in FIGS. 3A–3F and reference to FIG. 2A. As shown in FIG. 3A, a hypothetical actuation of sensor 32 is shown between times $t_1$ and $t_3$. During this time interval, sensor 32 is positioned in the "on state" coupling electrical ground to node 45. A current path is thereby created from reserve power supply 50, resistor 52, and capacitor 54 to electrical ground. Accordingly, capacitor 54 begins charging at time constant $TC_1$ (see FIG. 3B). By time $t_2$ a sufficient voltage is reached to turn on transistor 58 via a voltage divider provided by resistors 56 and 62 (see FIG. 3C). This time period, between $t_1$ and $t_2$, is referred to as prefiltering time $t_p$.

When sensor 32 is activated for a time period at least equivalent to prefiltering time $t_p$, capacitor 54 charges sufficiently to turn on transistor 58. On the other hand, when sensor 32 is activated for less than prefiltering time $t_p$, capacitor 54 does not reach a sufficient charge to turn on transistor 58 and the ground state on node 45 is ignored. This circuitry is used to advantage for filtering out electromagnetic noise which might otherwise cause an erroneous crash indication. This prefiltering circuitry may also be utilized to compensate for a highly sensitive crash sensor which, in certain applications, may be activated by forces of deceleration other than those caused by actual vehicular crashes.

Figure 3D:
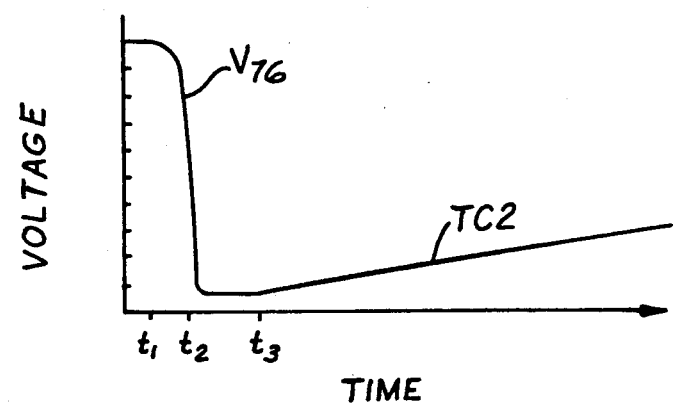
Figure 3E:
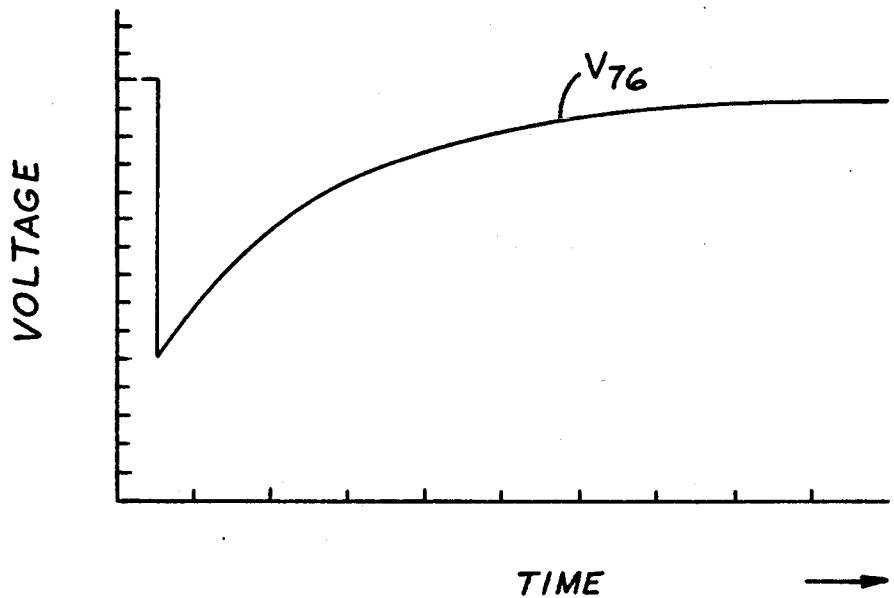
Figure 3F:
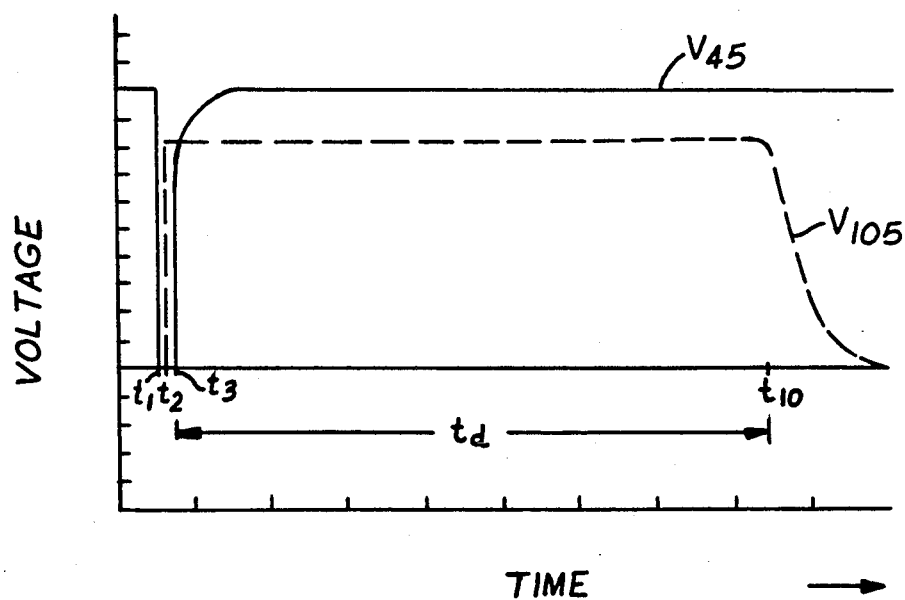

Referring now to FIG. 3D, and continuing with FIG. 2A, operation of module 10 for generating dwell time $t_d$ is described. During the "on" time of transistor 58, $V_{76}$ is at a relatively low voltage and, accordingly, transistor 78 is maintained in its "on" state. Further, capacitor 74 becomes fully charged by current flowing through capacitor 74, diode 92, resistor 94, and transistor 58. When either sensor 32 or sensor 34 opens (time $t_3$), transistor 58 is switched off, however, transistor 78 remains "on" while capacitor 74 discharges. More specifically, current flows from the positive plate of capacitor 74 through resistors 86 and 82 to the negative plate of capacitor 74. The corresponding voltage at this negative plate (i.e., $V_{76}$) is shown rising exponentially beginning at time $t_3$ in FIG. 3D. Transistor 78 remains in its "on" state until $V_{76}$ reaches a sufficiently high voltage to turn transistor 78 off as shown at time $t_{10}$ in FIGS. 3E and 3F.

In accordance with the particular example presented above, transistor 78 remains in its "on" state until time $t_{10}$ even though sensors 32 and 34 return to an open state at time $t_3$. The time interval $t_3-t_{10}$ is referred to as dwell time $t_d$ which represents an extension of the time response of sensors 32 or 34 to a crash. Transistor 108 essentially follows the state of transistor 78, via voltage $V_{105}$. As shown in the particular example presented in FIG. 3F, transistor 108 is "on" between time $t_2$ (a prefiltering time after sensors 32 or 34 first respond to a deceleration force) and time $t_{10}$ (the end of dwell time $t_d$).

As previously discussed herein, transistor 108 is connected in series between sensor 22, ignitors 22a-b, and passenger compartment electrical ground 16. Transistor 108 is also connected in parallel to sensors 32 and 34. Thus, during vehicular deceleration, electrical power is supplied to ignitors 22a-b whenever sensor 22 closes during dwell time $t_d$. Further, should the circuitry of module 10 fail to provide dwell time $t_d$, electrical power will still be applied to ignitors 22a-b when sensor 22 is closed concurrently with either sensor 32 or sensor 34.

For the particular embodiment presented herein a table of various electrical values which have been used to advantage is presented below. Those skilled in the art will recognize that neither the invention described herein, nor the particular embodiment presented herein which utilizes the invention to advantage, are limited by the values presented in this table.

This concludes the Description of the Preferred Embodiment. The reading of it by those skilled in the art will bring to mind many modifications and alterations which do not depart from the spirit and the scope of the invention claimed later herein. For example, any number of crash sensors, and both parallel and series interconnections thereof, may be used to advantage with the invention claimed herein. Further, the invention claimed herein may be used to advantage with circuitry other than the particular circuitry shown by the illustration of module 10. Accordingly, the invention is to be limited only by the following claims.

TABLE:

| Resistors | | Capacitors | |
|---|---|---|---|
| 94 | 10 Ω | 64, 90, 112, 246 | .01 μF |
| 216 | 220 Ω | 54, 74, | 2.2 μF |
| 62 | 390 Ω | 210 | 100 μF |
| 56 | 750 Ω | 160 | 2200 μF |
| 52, 98, 122 | 1 KΩ | | |
| 242 | 1.5 KΩ | | |
| 174, 196 | 2.2 KΩ | | |
| 198 | 3.3 KΩ | | |
| 166 | 4.7 KΩ | | |
| 46, 82, 176, 204, 243, 244 | 10 KΩ | | |

TABLE:-continued

| | |
|---|---|
| 86, 114 | 22 KΩ |
| 192 | 24.9 KΩ |
| 190 | 100 KΩ |
| Diodes | |
| 68, 70, 120, 130, 132, 134, 136, 182, 188 | EGP20D |
| 92, 102, 180, 214, 236, 238, 250, 252 | IN4004 |
| 110 | 8.2 V Zener |
| 212 | 10 V Zener |
| 116 | 39 V Zener |

What is claimed:

1. A triggering system responsive to a vehicular crash for actuating a safety device ignitor which is in a passenger compartment of the vehicle, comprising:
   a plurality of first detection means each providing a first triggering on state in response to a deceleration force;
   circuitry means responsive to each first triggering on states for providing a second triggering on state having a predetermined time duration;
   at least one second detection means for providing at least one third triggering on state in response to said deceleration force; and
   redundancy means for activating the safety device during a simultaneous occurrence of both said second triggering on state and any of said third triggering on states, said redundancy means also activating the safety device during a simultaneous occurrence of any of said first triggering ion states and any of said third triggering on states independently of said second triggering on state thereby providing a redundant actuation of the safety device ignitor.

2. The triggering system recited in claim 1 wherein said first detection means and said second detection means each comprise accelerometers.

3. The triggering system recited in claim 1 wherein said second detection means has a greater sensitivity to said deceleration force than said first detection means.

4. The triggering system recited in claim 1 further comprising an airbag system coupled to said safety device ignitor.

5. A triggering system for applying electrical power to an electrical ignitor of an airbag positioned in a passenger compartment of a motor vehicle, comprising:
   a plurality of first accelerometers each being electrically connected between the electrical ignitor positioned within the passenger compartment and a vehicular ground;
   circuitry means electrically connected between said electrical ignitor and an electrical ground for providing an actuating state during a predetermined time after actuation of any of said first accelerometers; and
   a second accelerometer electrically connected in series between said electrical ignitor and a source of electrical power for coupling electrical power through said electrical ignitor to said vehicular ground upon simultaneous actuation of said second accelerometer and any of said first accelerometers independently of said actuating state of said circuitry means, said electrical power also being coupled through said electrical ignitor to said electrical ground upon actuation of said second accelerometer concurrently with said actuating state of said circuitry means.

6. The triggering system recited in claim 5 wherein said second accelerometer has greater sensitivity to a deceleration force than said first accelerometer.

7. The triggering system recited in claim 5 wherein said second accelerometer is positioned in the passenger compartment.

8. The triggering system recited in claim 5 wherein said circuitry means further comprises prefiltering means for providing said actuating state after actuation of any of said first accelerometers for a preselected time.

9. A triggering system for applying electrical power to an electrical ignitor of an airbag positioned in a passenger compartment of a motor vehicle, comprising:
   a plurality of first accelerometers positioned forward of the passenger compartment, each being electrically connected between the electrical ignitor located within the passenger compartment and a vehicular ground located forward of the passenger compartment for providing a conductive path therebetween upon actuation by a vehicular deceleration force;
   an electrical module positioned in the passenger compartment having a power supply located thereon with an electrical ground remote from said vehicular ground;
   circuitry means positioned on said module and electrically connected between said electrical ignitor and said electrical ground for providing an actuating state for a predetermined time after any of said first accelerometers have provided said conductive path for a preselected time; and
   a second accelerometer electrically connected in series between said electrical ignitor and said power supply for coupling electrical power through said electrical ignitor to said vehicular ground upon simultaneous actuation of said second accelerometer and any of said first accelerometers independently of said actuating state provided by said circuitry means, said second accelerometer also coupling said electrical power through said electrical ignitor to said electrical ground upon actuation of said second accelerometer concurrently with said conductive state of said circuitry means.

10. The triggering system recited in claim 9 wherein said second accelerometer has greater sensitivity to said deceleration force than said first accelerometers.

11. The triggering system recited in claim 9 wherein said second accelerometer is positioned on said module.

12. The triggering system recited in claim 9 wherein said circuitry means is powered by a voltage source positioned on said module which is independent of said power supply positioned on said module.

* * * * *